United States Patent

Schulz

[15] 3,653,603

[45] Apr. 4, 1972

[54] TAPE REEL CLAMP

[72] Inventor: Gordon R. Schulz, Tujunga, Calif.

[73] Assignee: Odetics, Inc., Anaheim, Calif.

[22] Filed: Nov. 3, 1970

[21] Appl. No.: 86,534

[52] U.S. Cl. ....................242/68.3
[51] Int. Cl. ....................B65h 17/02
[58] Field of Search ....................242/60.3

[56] References Cited

UNITED STATES PATENTS

| | | | |
|---|---|---|---|
| 3,278,133 | 10/1966 | Froehlich | 242/68.3 |
| 3,383,067 | 5/1968 | Uritis | 242/68.3 |
| 3,405,881 | 10/1968 | Sanford et al | 242/68.3 |
| 3,532,286 | 10/1970 | Mallette | 242/68.3 |
| 3,542,305 | 10/1968 | Feierabend | 242/68.3 |
| 3,574,365 | 4/1971 | Bailey et al. | 242/68.3 X |

FOREIGN PATENTS OR APPLICATIONS

| | | | |
|---|---|---|---|
| 1,191,651 | 4/1965 | Germany | 242/68.3 |

*Primary Examiner*—Stanley N. Gilreath
*Assistant Examiner*—Milton Gerstein
*Attorney*—Allen A. Dicke, Jr.

[57] ABSTRACT

The tape reel clamp provides rotative, radial and axial mounting security. The hub of the tape reel mounts on a rotatable spindle for radial security. A radially expandable ring extends outward from the spindle and engages over the top of the reel hub for axial security. A raisable handle cams the ring into its retracted, non-engagement position wherein the hub can be removed from the post. A pin on the handle engages a slot in the hub to provide rotative locking of the hub.

9 Claims, 3 Drawing Figures

INVENTOR;
GORDON R. SCHULZ
BY;
ALLEN A. DICKE, JR.,
AGENT

INVENTOR;
GORDON R. SCHULZ
BY;
ALLEN A. DICKE, JR.,
AGENT

TAPE REEL CLAMP

BACKGROUND

This invention is directed to a tape reel clamp by which a tape reel is secured onto a rotatable spindle. The rotatable spindle either provides windup torque or unwinding drag tension control. The tape reel clamp permits tape reel removal from the spindle, and provides rotatable and axial locking of the tape reel upon the spindle.

The clamping of reels onto drive spindles and the like is a recognized art. Prior reel clamps have included radially expandable structures which resiliently engage the interior of the reel hub to lock it to the spindle. These suffer from the fault that a reel must be mounted to run concentrically accurate so that tension perturbations do not occur. Whenever a resilient structure is employed as radial positioning means, the rotative accuracy of the mounted tape reel cannot be assured. The prior art includes radially expandable structures mounted on tape reel spindles having both metallic radially expandable and elastomeric radially expandable materials for engagement in the interior of the tape reel hub. Such cannot define a repeatedly accurate rotative surface.

Another class of prior devices for holding tape reels on their spindles comprises nuts which engage the spindle and engage over the upper surface of the reel. In this case, the spindle itself or a rigid structure mounted thereon comprises the radial mounting surface. The problem with threaded locking structures is that they require torque to lock in place, which torque can inadvertently stretch the tape where it extends to other elements in the tape deck. Furthermore, rotatable nut locking structures take considerable time to screw up tight, as compared to the tape reel clamp of this invention.

Another class of prior art devices includes spindles from which dogs extend over the outer surface of the tape reel hub to hold the hub in place. The dogs of the prior art are small, and must necessarily be multiplied in order to provide a fair amount of axial security. These multiple dogs require a complicated operating mechanism so that they can all be withdrawn when required.

SUMMARY

In order to aid in the understanding of this invention, it can be stated in essentially summary form that it is directed to a tape reel clamp. The tape reel clamp is mounted in a tape reel mounting spindle. The spindle has formed thereon a radial surface and an axial shoulder surface which respectively radially and axially locate a tape reel hub. A resilient, metallic clamp ring is located in a recess in the spindle and in its unstressed condition extends radially outward therefrom. It is axial positioned to engage over a tape reel on the spindle to hold the reel against its axial shoulder. A lever cams the clamp ring into its stressed, recessed position wherein the reel can be axially removed from this spindle.

If desired, the handle can carry a pin for engagement with the hub to provide a rotative locking, when the lever is in a position wherein the ring is extended.

Accordingly, it is an object of this invention to provide a tape reel clamp which permits mounting of a tape reel upon a spindle, and axially locks the tape reel thereon by means of a metallic ring extending from the spindle. It is a further object to provide a tape reel clamp wherein lever means on the spindle selectively retracts the metallic, resilient clamp ring for installation and removal of a tape reel from the spindle. It is a further object to provide a manually-operable lever for retraction of the resiliently-extended clamp ring, and to provide a pin on the lever, which pin engages with the tape reel hub when the lever is in the resilient clamp ring extended position to engage in an opening in the tape reel to provide rotative locking of the tape reel on the spindle.

Other objects and advantages of this invention will become apparent from a study of the following portion of the specification, the claims and the attached drawings.

DESCRIPTION

Figure 1:
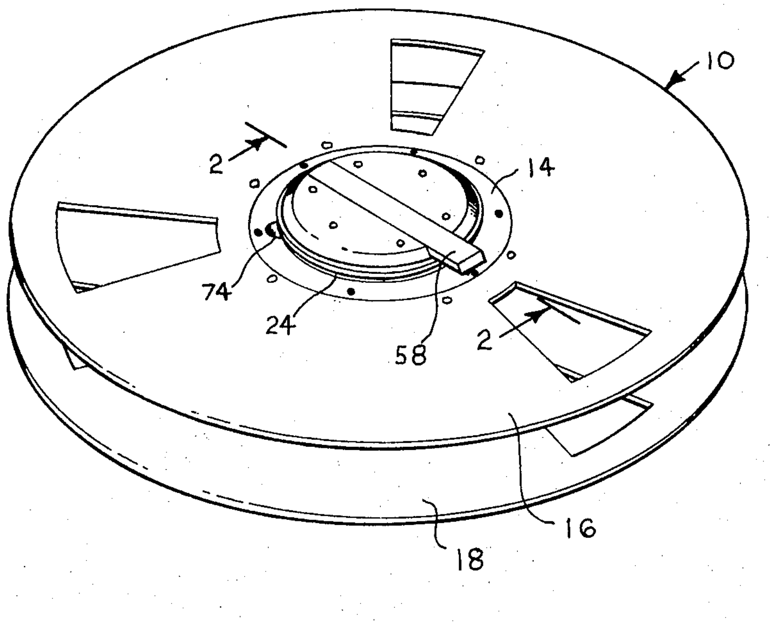
FIG. 1 is a perspective view of the tape reel clamp of this invention with a tape reel mounted thereon.

The drawings illustrate a tape reel 10 mounted upon spindle 12. The tape reel has a hub 14 on which are mounted upper and lower flanges 16 and 18. Hub 14 has a conventional cylindrical outer surface upon which tape is wound. The tape reel clamp of this invention is particularly useful for clamping reels of magnetic tape. However, it is useful for reels of other similar character. Thus, the utility of the tape reel clamp will be described with respect to its employment with magnetic tapes. It will be appreciated, however, that reels of paper or plastic tape, photographic film and the like can be just as readily employed with the present tape reel clamp.

The requirement of tape reel 10 is that it be rotated for winding and unwinding the tape with respect to the reel. For this reason, spindle 12 is rotatively mounted, so that the flexible magnetic tape can be wound on or off tape reel 10. The rotatable mounting of spindle 12 is no part of this invention, but a usual tape reel drive means is employed. For windup, this conventionally requires the employment of suitable bearings for rotatable mounting of the spindle 12, and a drive of suitable torque characteristics for winding the tape with proper tension. When the tape reel is mounted upon a spindle from which the tape is to be unwound, quite often the spindle has a brake thereon, such as an eddy current brake. The tape reel clamp of this invention is useful for mounting a tape reel either for winding or unwinding.

Spindle 12 is provided with a cylindrical surface 20 and an axial shoulder surface 22 against which the hub 14 of reel 10 can rest. The surfaces 20 and 22 are respectively cylindrical with respect to and perpendicular to the axis of rotation of spindle 12 so that, when a tape reel is mounted thereagainst, the tape reel runs concentrically with the axis of spindle 12. The fit between the interior surface of hub 14 and the cylindrical surface 20 is such as to minimize radial play. In order to maintain the tape reel against the shoulder of axial surface 22, clamp ring 24 is provided. Clamp ring 24 is mounted in groove 26. Groove 26 is conveniently formed by placing spacer disc 28 on the top of spindle 12 and covering it with cover plate 30.

Figure 2:
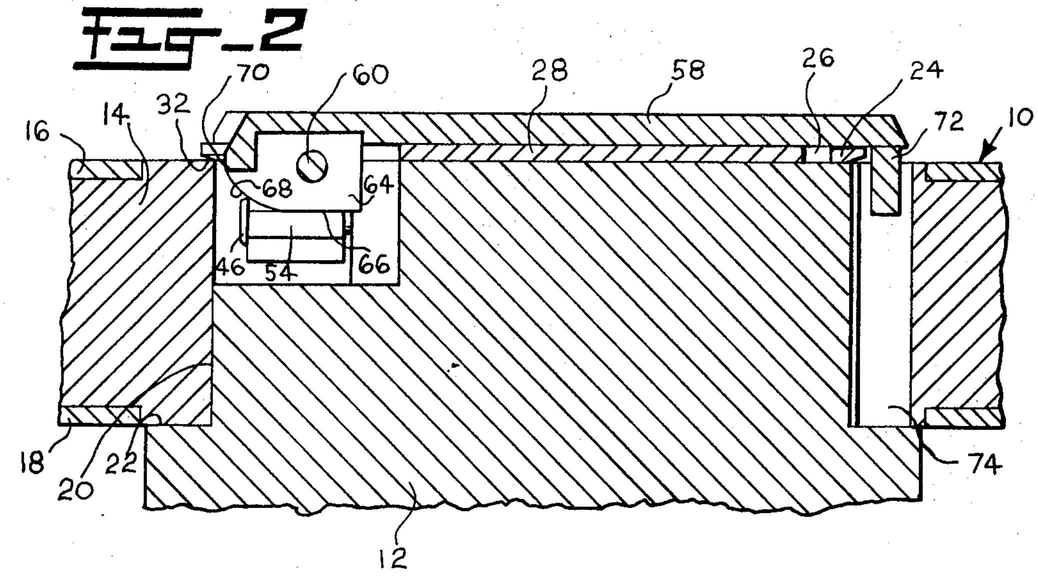
FIG. 2 is an enlarged partial section, taken generally along the line 2—2 of FIG. 1.

Clamp ring 24 is a resilient metal ring. It is conveniently a snap ring made out of steel, and having a chamfered, beveled undersurface 32. In FIG. 2, clamp ring 24 is shown in its resiliently-extended position where it is normally sprung outward from the cylindrical surface 20. The chamfered, beveled undersurface 32 is engaged on the top of the hub 14 to axially thrust hub 14 downward against shoulder 22. Thus, the tape reel 10 is axially restrained. The clamp ring 24 is not a completely circular ring, but has ends 34 and 36 shown in FIG. 3. Adjacent the ends, holes 38 and 40 are respectively perforated through the ring. These are provided in the normal commercialy available snap ring in order to engage the ring to draw it into a resiliently compressed condition.

Figure 3:
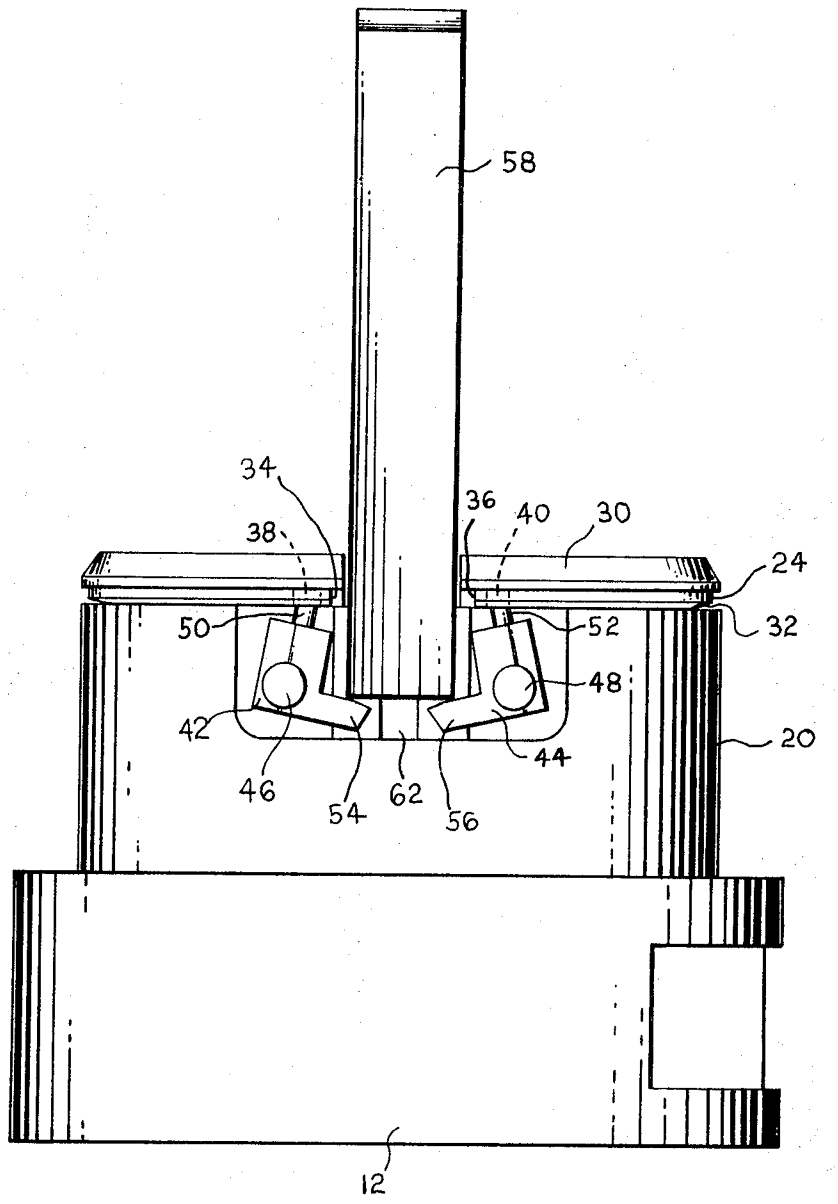
FIG. 3 is a side-elevational view of the spindle, at right angles to FIG. 2, showing the clamp mechanism in the disengaged position.

FIG. 3 shows operating levers 42 and 44 respectively mounted upon pivot pins 46 and 48. The upper ends of the operating levers 42 and 44 respectively carry engagement pins 50 and 52 which respectively engage in the holes 38 and 40. The inwardly-extending fingers of levers 42 and 44 are cam followers 54 and 56. Handle 58 is manually engageable, but when not in use, folds down into a slot in cover plate 30, so it is flush, as is illustrated in FIGS. 1 and 2. Handle 58 is pivoted upon pivot pin 60 which extends through post 62. A cam face extends downwardly from the handle on each side of the post, with the cam 64 illustrated in FIG. 2. The unshown cam is identical. Cam 64 engages cam follower 54 for its operation.

When handle 58 is in the unengaged, lowered position shown in FIGS. 1 and 2, flat 66 engages against the cam follower. The spring load of clamp ring 24, through operating lever 42, against this flat creates the detented, lowered position of handle 58. As the handle is raised, the curved cam surface 68 causes rotation of operating levers 42 and 44 to the position of FIG. 3 until flat 70 is against the operating levers, as is shown in FIG. 3. This is the detented, raised position of handle 58. As the handle is raised, rotation of the operating levers springs the snap ring inwardly so that, when the handle is in the fully raised position, the clamp ring is radially inward from surface 20 to permit the removal of and installation of a tape reel onto the spindle. As one tape reel is removed and another is installed, the handle 58 remains in its raised position shown in FIG. 3. When the new reel is in place, the handle is lowered, permitting the snap ring 24 to expand outwardly and engage the upper surface of the tape reel hub. Thus, the tape reel is firmly axially and radially secured.

In order to provide positive rotative locking of the tape reel upon the spindle, pin 72 is secured to the outer end of handle 58 on its underside. This pin is in position for engagement with grooves 74 which are located around the interior of the hub bore of a standard tape reel. By this means, rotational locking is also accomplished.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

What is claimed is:

1. A tape reel clamp, said tape reel clamp being mounted upon a rotatable spindle having a radial support surface and an axial shoulder for the mounting of a tape reel on said radial support surface and against said shoulder for rotation with said spindle upon rotation of said spindle, said tape reel clamp comprising:

a radially extending substantially circumferential slot in said radial support surface substantially parallel to and spaced from said shoulder, a resiliently deformable metal clamp ring positioned within said slot and having an unstressed position in which it extends partially out of said slot so that it can engage over the hub of a reel positioned on said radial support surface and against said shoulder; and compression means for compressing said clamp ring into said slot so that said clamp ring does not extend beyond said radial support surface so that upon actuation of said compression means said clamp ring is resiliently stressed into said slot.

2. The tape reel clamp of claim 1 wherein said clamp ring is a substantially circular clamp ring having engagement means adjacent the ends thereof, said compression means including first and second levers engaging said engagement means, and a handle engaging said first and second levers to move said levers from a clamp ring extended position to a clamp ring retracted position.

3. The tape reel clamp of claim 2 wherein said handle lies in a slot in the end of said spindle when said clamp ring is in its radially extended position.

4. The tape reel clamp of claim 3 wherein a pin is mounted on said handle, said pin being positioned to engage a groove in a tape reel hub when said handle is positioned in said slot in said spindle to rotatively lock said tape reel hub with respect to said spindle.

5. The tape reel clamp of claim 2 wherein said clamp ring has a beveled undersurface thereon, said beveled undersurface engaging against a tape reel hub and urging the tape reel hub against said axial shoulder when said clamp ring is allowed to resiliently extend from its groove.

6. The tape reel clamp of claim 2 wherein said engagement means on said clamp ring comprises holes adjacent the ends of said clamp ring, said levers engaging said holes being operating levers each having a cam follower thereon, cam face means on said handle facing said cam followers for actuating said operating levers to retract said clamp ring into its groove when said handle is raised from its rest position to a raised position.

7. The tape reel clamp of claim 6 wherein said cam face means has a first flat thereon against said cam followers when said handle is in its rest position and having a second flat thereon against said cam followers when said handle is in its raised position so that said handle is detented against rotative force in both its rest and raised positions.

8. The tape reel clamp of claim 7 wherein a pin is mounted on said handle, said pin being positioned to engage a groove in a tape reel hub when said handle is positioned in said slot in said spindle to rotatively lock said tape reel hub with respect to said spindle.

9. The tape reel clamp of claim 8 wherein said clamp ring has a beveled undersurface thereon, said beveled undersurface engaging against a tape reel hub and urging the tape reel hub against said axial shoulder when said clamp ring is allowed to resiliently extend from its groove.

* * * * *